(12) United States Patent
Fields

(10) Patent No.: US 6,769,991 B2
(45) Date of Patent: Aug. 3, 2004

(54) ELECTRONIC GAME PACK SYSTEM

(76) Inventor: Kyle Fields, Design Labs, Inc. 3054 Fite Cir., #101, Sacramento, CA (US) 95827

( * ) Notice: Subject to any disclaimer, the term of this patent is extended or adjusted under 35 U.S.C. 154(b) by 292 days.

(21) Appl. No.: 10/011,003

(22) Filed: Nov. 30, 2001

(65) Prior Publication Data

US 2002/0049088 A1 Apr. 25, 2002

Related U.S. Application Data

(63) Continuation of application No. 09/400,393, filed on Sep. 21, 1999, now abandoned.
(60) Provisional application No. 60/101,390, filed on Sep. 21, 1998.

(51) Int. Cl.[7] .................................................. A63F 9/00
(52) U.S. Cl. ........................................... 463/43; 463/19
(58) Field of Search .............................. 463/16–19, 22, 463/31, 42, 43, 44, 45; 273/138.1, 237, 269; 345/168, 169

(56) References Cited

U.S. PATENT DOCUMENTS

| | | | |
|---|---|---|---|
| 4,143,417 A | 3/1979 | Wald et al. ................. 364/900 |
| 4,373,726 A | 2/1983 | Churchill et al. ....... 273/138 A |
| 4,475,157 A | 10/1984 | Bolan ......................... 364/410 |
| 4,534,012 A * | 8/1985 | Yokozawa ................... 368/327 |
| 4,624,462 A | 11/1986 | Itkis ........................... 273/237 |
| 4,628,457 A * | 12/1986 | Manduley .................... 705/405 |
| 4,661,906 A | 4/1987 | Difrancesco et al. ....... 364/410 |
| 4,768,151 A * | 8/1988 | Birenbaum et al. ........... 463/19 |
| 4,856,787 A | 8/1989 | Itkis ........................... 273/237 |
| D305,883 S * | 2/1990 | Burton ....................... D14/324 |
| 5,043,887 A | 8/1991 | Richardson ................. 364/410 |
| 5,072,381 A | 12/1991 | Richardson et al. ........ 364/410 |
| 5,096,195 A * | 3/1992 | Gimmon ........................ 463/20 |
| 5,184,830 A | 2/1993 | Okada et al. ................ 273/433 |
| 5,327,067 A * | 7/1994 | Scholder ..................... 320/107 |
| 5,401,024 A | 3/1995 | Simunek ................. 273/138 A |
| 5,436,857 A * | 7/1995 | Nelson et al. .............. 708/140 |
| 5,477,123 A * | 12/1995 | Allen et al. ................. 320/124 |
| 5,478,084 A | 12/1995 | Itkis ........................... 273/239 |
| 5,621,890 A | 4/1997 | Notarianni et al. ..... 395/200.01 |
| 5,683,295 A * | 11/1997 | Frain ........................... 463/19 |
| 5,689,654 A | 11/1997 | Kikinis et al. .............. 395/281 |
| 5,718,631 A | 2/1998 | Invencion ..................... 463/19 |
| 5,770,533 A | 6/1998 | Franchi ........................ 463/42 |
| 5,800,269 A | 9/1998 | Holch et al. ................. 463/42 |
| 5,828,862 A | 10/1998 | Singkornrat et al. ........ 395/442 |
| 5,871,398 A * | 2/1999 | Schneier et al. .............. 463/16 |
| 5,973,656 A | 10/1999 | Yokoi et al. .................. 345/82 |
| 5,978,569 A | 11/1999 | Traeger ................. 395/200.74 |
| 6,008,621 A * | 12/1999 | Madison et al. ............. 320/107 |
| 6,029,215 A | 2/2000 | Watts, Jr. et al. ........... 710/101 |
| 6,049,813 A | 4/2000 | Danielson et al. .......... 708/100 |
| 6,218,796 B1 * | 4/2001 | Kozlowski ................. 318/280 |
| 6,424,260 B2 * | 7/2002 | Maloney .................. 340/568.1 |

\* cited by examiner

Primary Examiner—Mark Sager
Assistant Examiner—Steven Ashburn
(74) Attorney, Agent, or Firm—Cislo & Thomas LLP

(57) ABSTRACT

A system and method for managing an electronic game system comprising a central computer for accessing a database, one or more remote playing units, and one or more plug-in modules for providing power to a playing unit and for transferring data from the database to the playing unit. The central computer may operate as a point-of-sale cashier station where customized game or instructional data is transferred from the database to the plug-in module. The plug-in module also has a rechargeable battery which receives a charge from a charging rack between playing sessions. The purchased plug-in modules are then inserted in playing units that receive both power and the customized game data from the plug-in modules.

19 Claims, 8 Drawing Sheets

ELECTRONIC GAME PACK SYSTEM

CROSS REFERENCES TO RELATED APPLICATIONS

This Application claims the benefit of, and pursuant to 35 U.S.C. §119(e) hereby makes express reference to, U.S. Provisional Application No. 60/101,390 filed on Sep. 21, 1998, which by this reference is incorporated as if fully set forth herein. This Application is a continuation of, also claims the benefit of, and pursuant to 35 U.S.C. §120 hereby makes express reference to, U.S. Patent Application No. 09/400,393 filed on Sep. 21, 1999, now abandoned, which by this reference are incorporated as if fully set forth herein.

BACKGROUND OF THE INVENTION

1. Field of the Invention

The present invention relates generally to electronic game systems, and more particularly to electronic game systems that involve an election or random selection of the games starting point and configuration. Such systems include bingo game systems, action and adventure fantasy game systems, as well as other game systems. The common principle of these systems is that they comprise a central computer that accesses a database, one or more remote playing units, and one or more plug-in modules for transferring data from the database to the playing unit.

2. Description of the Related Art

Computers managing computer databases have crept into every corner of life, and in particular into the areas games and entertainment. Relevant to the present invention are computers and computer databases that are used in the playing of games, such as systems comprising a central computer and a plurality of remote playing units which receive customized game information from the central computer.

With the growing competition to make such computers easier to operate and more enjoyable to interact with, the input/output devices used in the computers make substantial demands on the power supply. Where the playing units are powered by batteries, such as where the units are designed to be portable, these power demands result in the need to replace or recharge the batteries often.

The game of bingo, for instance, continues to be extraordinarily popular in the United States. Bingo is often set up at church halls with a portion of the proceeds going to charity, or is played in bingo parlors, e.g. on Indian reservations. Bingo players typically play several cards at a time, perhaps up to 12 cards, in order to increase their odds of winning. Manually playing this many cards can be tedious, however, leaving one tired or prone to errors. With paper bingo cards there is also the possibility of cheating, i.e. bingo players attempting to alter the numbers on the cards.

With the coming of the computer age and advances in electronics, various electronic games have been developed to aid a player in playing bingo games. Such games may assist a player in overseeing more bingo cards than would be possible or practical otherwise. U.S. Pat. No. 4,475,157 discloses such a device, where between each game the player must manually enter each number from each card into the memory unit. The manual entry, however, is slow and tedious, and creates a practical limitation on the number of bingo cards that can be entered before and between bingo game sessions.

U.S. Pat. No. 4,768,151 discloses a device that provides for the creation of whole playing cards simply by the manual entry of a card identification number. This process improves the speed of entering the selected cards into the game piece memory, but requires the cooperation of bingo card manufacturers to provide identification numbers for their cards such that each identification number is associated with one specific pattern of numbers on a card.

Both of these approaches are in essence ad hoc methods for assisting a player in an otherwise traditional, manual game of bingo. Either of these approaches may create resentment from competing players who are playing the game without electronic assistance. Thus, these approaches suffer from the impression that they create an unfair playing environment or that their operators are too serious or too greedy.

On the other hand, electronic gaming systems have been developed for use in bingo parlors, where each player is equipped with a playing unit and the use of paper playing cards is either eliminated or at least reduced. These systems typically include a central computer which performs administrative tasks including sale of bingo cards, running the bingo game, and sometimes electronic payment to the winners. In connection therewith, players sit at hard-wired electronic bingo stations or may be given stand-alone playing units, through which the players are provided with the desired number of card configurations for each game.

U.S. Pat. Nos. 4,856,787 and 5,043,887 disclose hard-wired or network electronic bingo systems where a central computer communicates with each remote unit before and during the bingo game. All purchases and all game-related data may be communicated through communication lines between the central computer and the remote units. The drawbacks of these games include the resultant undesirable "Las Vegas" feel of the game, the general lack of portability of the system, the lack of portability of the individual playing units, and the complications that can arise from maintaining a computer network system.

The stand-alone playing unit approach marries the best of all of the above approaches. The typical system comprises a central computer, which operates in part as a cashier station where all purchases are made. The player purchases a number of games to be played and a number of cards to be played in each game. The computer generates the playing card information and places the information into a memory module, and the player carries the memory module away in much the same way a player would carry away with him one or more bingo cards in a traditional bingo game. The player carries away the memory module either along with a portable playing unit or to such a unit already placed in a playing area.

The player inserts the memory module into the playing unit before the bingo game begins. Throughout the bingo games, the player inputs the called numbers into the playing unit through a customized keypad, and the playing unit alerts the player if one or more of the stored cards achieves a winning sequence. This approach retains the feel of a traditional bingo game, including the fact that the player carries away the purchased bingo cards and enters the called numbers manually. It also provides more of an appearance of equality since every player is provided with an identical electronic playing unit and memory module.

In recent years, the capability of these portable playing units has increased, typically to include color displays, speakers, and other components which consume significant amounts of power. If the playing units are battery powered, they typically need to be recharged after each use. To recharge the units and to prepare them for issuance for new bingo games, the playing units must all be gathered at a central charging station. This is a time-consuming process and requires a great deal of room, since a bingo hall may need to recharge hundreds of playing units in a short period of time and since the playing units may be considerably bulky depending on their display requirements versus their portability requirements.

Current electronic bingo systems which use stand-alone playing units also require some means of downloading or configuring each unit before each session of play. This configuration typically includes loading the number and description of cards purchased by the player, the type of win pattern and variation of bingo game for each game of the playing session, and other game options. This downloading of information typically uses some form of wired, or wireless, communication link which configures the playing unit at the cashier station when the player enters the bingo hall.

As the capability of electronic technology and the displays used in such standalone playing units increases, it becomes possible for the player units to play games and attractions other than bingo, or more than one type of game at a time. In a gaming casino environment, many of these games will allow the player to accumulate prize winnings and other information. At the end of play this information must be transferred from the portable playing units back to a central computer station to allow for payment of prizes or other accounting of winning information.

All of these requirements of charging the game unit batteries, loading game information to the game unit at the start of play and reading prize information after play require significant amounts of handling and transportation of the game units in the bingo hall. Since a single bingo hall can contain hundreds of such units, the handling of the portable handset units is a significant problem for the bingo operators and also frequently leads to damage of the units due to rough handling or dropping when carrying the units.

What is needed is a system which efficiently meets the requirements of recharging of batteries, loading game information to playing units, and reading of prizes from the portable playing units after play, and which minimizes the charging space and handling requirements for the playing units.

SUMMARY OF THE INVENTION

A system and method for managing an electronic game system comprising a central computer for accessing a database, one or more remote playing units, and one or more plug-in modules for providing power to a playing unit and for transferring data from the database to the playing unit. The central computer may operate as a point-of-sale cashier station where customized game or instructional data is transferred from the database to the plug-in module. The plug-in module also has at least one rechargeable battery which receives a recharge from a charging rack between sessions of use. The purchased plug-in modules are then inserted in playing units that receive both power and the customized game configuration data from the plug-in modules.

In particular, one embodiment of the invention is directed to a system and method for managing bingo games in which the plug-in module transfers game card configuration data from the central computer to a playing unit and provides power to the playing unit. The playing unit therefore receives operating power from the plug-in module and translates the game information data into the various game displays. The playing unit is operated through an entry means by a player who enters the called numbers into the playing unit or monitors the playing unit for the progress of the game, or both. The playing unit with the plug-in module inserted compares the game information data and the called numbers for winning or near-winning combinations and alert the player as to the progress of the game. If the player achieves a winning sequence, that win can be either verified or corroborated by the central computer. The system further comprises a charging rack into which the plug-in modules are inserted after operation to be recharged and stored for the next series of games.

An object of the invention is to provide a system and method for providing power and customized game data to remote playing units in a manner that facilitates efficient recharging of the batteries and reconfiguration of the customized data between sessions of use, as well as a convenient method of storing the plug-in modules between sessions of use.

Another object of the invention is to provide a system and method for multiple-user customized game playing amenable to input/output devices that require substantial power resources, such as high-resolution color displays, active-matrix displays, sound systems, radio-frequency input devices, and touch-sensitive input devices.

A further object of this invention is to provide a system and method for multiple-user customized game playing which exhibit the interactivity of a hard-wired network, but which avoid the drawbacks of a hard-wired network, such as the general lack of portability of the system and of the individual playing units and the high maintenance requirements of a local area network.

A further object of the invention is to provide a system and method for multiple-user game playing in which the players are given identical electronic devices in terms of hardware, but each having the capability of randomly selected game configurations or other action adventure scenarios.

These and other objects and advantages of the present invention will be apparent from a review of the following specification and accompanying drawings.

DESCRIPTION OF THE PREFERRED EMBODIMENT(S)

Figure 1:
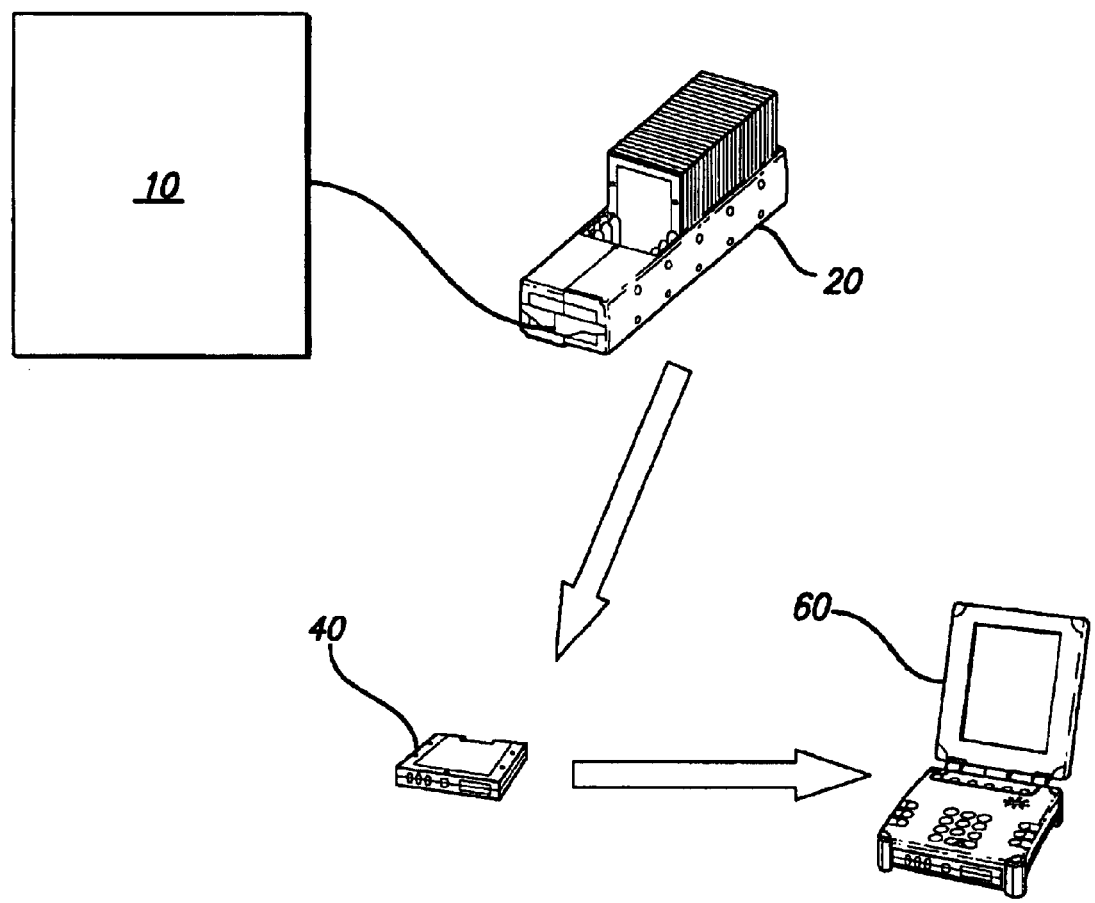
FIG. 1 is a flowchart showing the operation of Applicant's playing system, including charging, downloading, and dispensing the game packs or plug-in modules, and inserting a plug-in module into a playing unit.

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The electronic game pack system utilizing the plug-in module 40 and playing unit 60 of the present invention is illustrated in FIGS. 1 through 8, which depict a presently preferred embodiment of the invention. Applicant's electronic multi-user system basically comprises a central computer 10, a charging rack 20, a plurality of portable handsets or playing units 60, and a plurality of plug-in modules or game packs 40.

Figure 3:
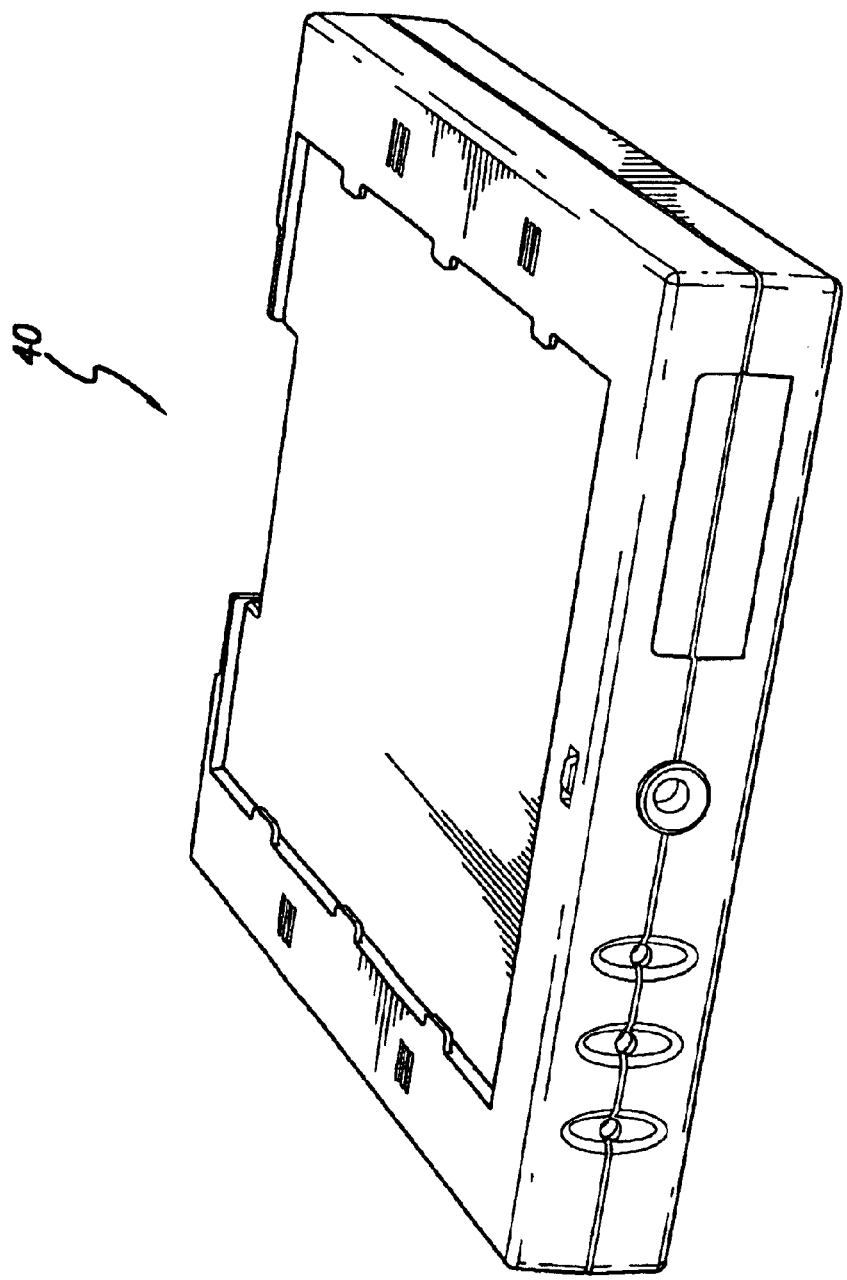
FIG. 3 is a perspective view of the plug-in module or game pack.
Figure 5:
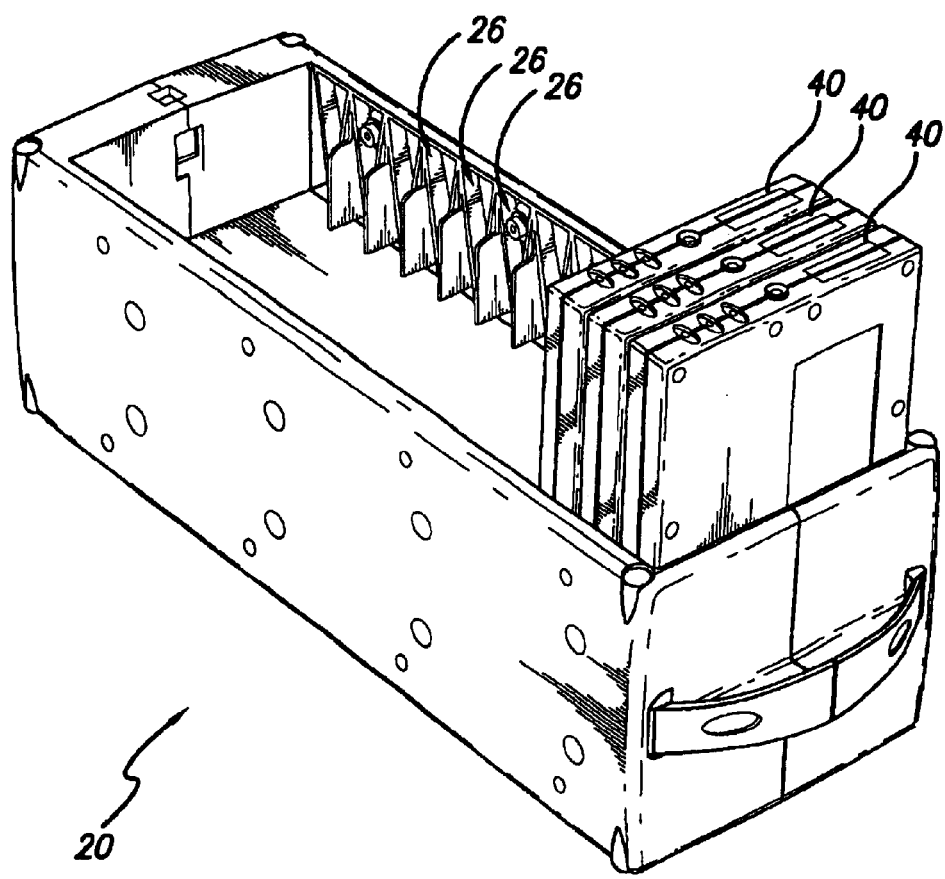
FIG. 5 is a perspective view of the charging rack.

The charging rack or other charging device 20, shown in FIG. 5, is configured to receive a plurality of the plug-in modules or game packs 40. The rack includes a battery recharge circuit 22 and may include communication means 24 from the central computer to transfer information to and from the game pack 40. The battery recharge circuit 22 converts 110 volts alternating current to direct current and charges the battery 42. The game packs 40, shown in FIG. 3, are designed to interface with the central computer 10, either through the communication means 24 within the charging rack or directly through a floppy disk drive or the like. The embodiment shown in FIG. 5 employs a charging rack 20, but any number of other charging devices, such as a conventional power transformer and cord or a customized cord configured to connect to a plurality of game packs or plug-in modules 40 at one time.

In this embodiment of the invention, the charging rack 20 quickly recharges the batteries 42 in the plug-in modules 40; allows new game information to be downloaded to the plug-in modules 40 from the host computer 10; and provides an easy way to store and to transport plug-in modules 40 from one place to another. It is contemplated for this invention, however, that the downloading of data from the host computer 10 may just as readily be performed through some means separate from the charging rack 20, such as by inserting the plug-in modules 40 into some other port or floppy drive in logical communication with the host computer 10.

In use, the charging rack 20 allows game packs 40 to be retrieved from the game playing units 60 and moved to another location for charging. Each rack 20 may hold and store any number of game packs 40. When the rack 20 is plugged into a wall outlet, the game packs 40 will begin to recharge. A serial connector 46 on the charging rack allows the rack to be connected to the serial port on the host computer 10. The computer 10, acting as a cashier terminal, is then capable of downloading specific game information into each of the game packs 40.

The charging rack 20 contains a standard DC power circuitry 22 which converts 110-120 VAC line voltage into 8.6 VDC. This voltage is used to recharge the batteries 42 in the game packs 40. Since each game pack 40 includes devices to regulate, monitor and control the battery charging 52, such devices are not required in the charging rack 20. Alternatively, the charging rack 20 itself could be equipped to regulate, monitor, and control the battery charging.

When the game packs 40 are inserted into the slots 26 in the charging rack 20, the connector mates and allows recharge power and other control signals to be accessed. A serial data connector 24 is provided on the charging rack 20 which connects to the central computer serial port 12. The serial data transmit and receive signals are connected to each of the individual game pack connectors.

Figure 8:
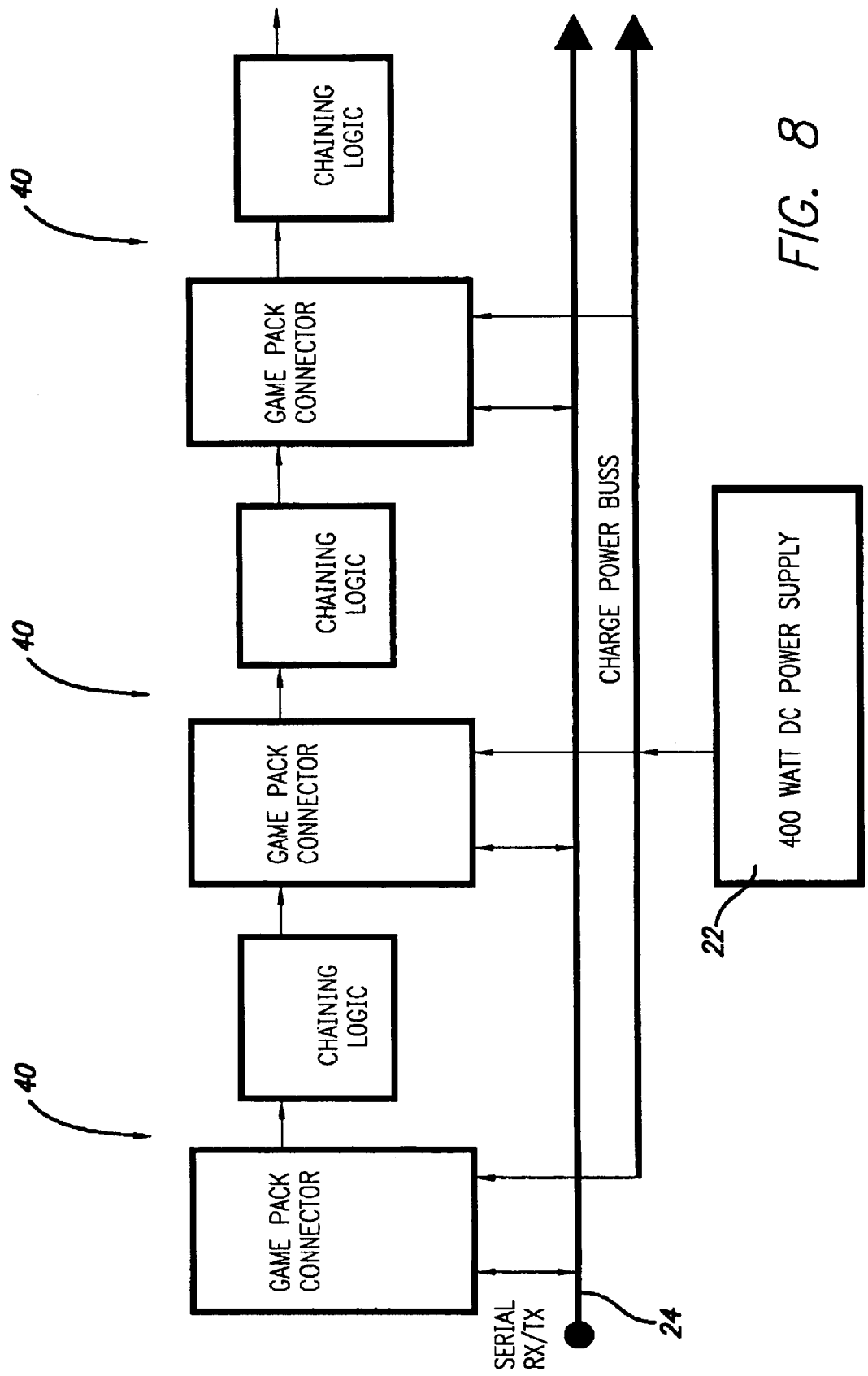
FIG. 8 is a block diagram showing the electronic hardware of the charging rack.

FIG. 8 is a block diagram of three game packs 40 connected to the charging rack 20 for charging and data transfer, although any number of game packs 40 could be similarly connected without meaningfully altering the present invention. In order to allow the host computer 10 to address each of the game packs 40 individually, a simple chaining scheme is used. In one embodiment, each game pack 40 has a SELECT IN and SELECT OUT signal on the connector. The SELECT IN signal must be asserted externally in order for the game pack 40 to be enabled for serial communication. Each pack 40 can assert a SELECT OUT signal. This signal indicates whether the game pack 40 is able to receive the serial commands. Should the pack 40 be unable to receive commands, for example, if the battery 42 is too low for reliable operation, then the game pack 40 will assert SELECT OUT allowing the next pack 40 in the charging rack 20 to receive the communication. The SELECT IN and SELECT OUT signals are buffered and switched with another signal, PACK IN, which indicates if a game pack 40 is inserted into a position in the charging rack 20. Using this signal, if no pack is inserted into a slot 26 in the rack 20, the chaining logic will automatically propagate the SELECT IN signal to the next game pack 40 in the rack 20. Once a pack 40 has received a full download of game information from the host computer 10, it asserts its SELECT OUT signal, thereby enabling the next game pack 40 in the chain to receive the next game download.

The game packs or plug-in modules 40, as shown in FIG. 3, each have a rechargeable battery 42 to power the playing unit 60, and each has a memory 44 for storing information which is transferred to and from a computer 10 through the charge and interface rack 20 to the portable handsets 60. Each plug-in module or game pack 40 includes a connector 46 to transfer power and data from between the charging and interface rack 20 and the portable handsets 60. The plug-in modules 40 may also include a microprocessor 50 which provides the communications means, and a circuit 52 which monitors the battery charge. The microprocessor 50 may also be employed to control the operation of the playing unit 60.

In a preferred embodiment, the game pack 40 receives and stores information used to describe the game to be played, allows the playing unit 60 to retrieve game configuration information, provides power to the game playing unit 60 via a rechargeable power source 42, provides battery monitoring and charge controller functions, and provides visual indicators for game pack status The game pack 40 serves as a transfer device—transferring data from the host computer system 10 to the game playing unit 60. Along with game data, the pack 40 also includes a rechargeable power system 42 which is capable of powering the game playing unit 60 for an extended period of time.

The game pack battery 42 is recharged using a charging system. In the preferred embodiment, the charging system is a rack 20 capable of holding any number of game packs 40, depending on the needs of the entertainment parlor. The rack 20 provides sufficient power to recharge the batteries 42 in the plug-in modules 40 and also provides a serial communication jack 24 for connection between the charging game packs 40 and the host computer system 10. This serial communication allows the host computer 10 to store specific game information in each pack 40, prior to the start of the game.

Figure 6:
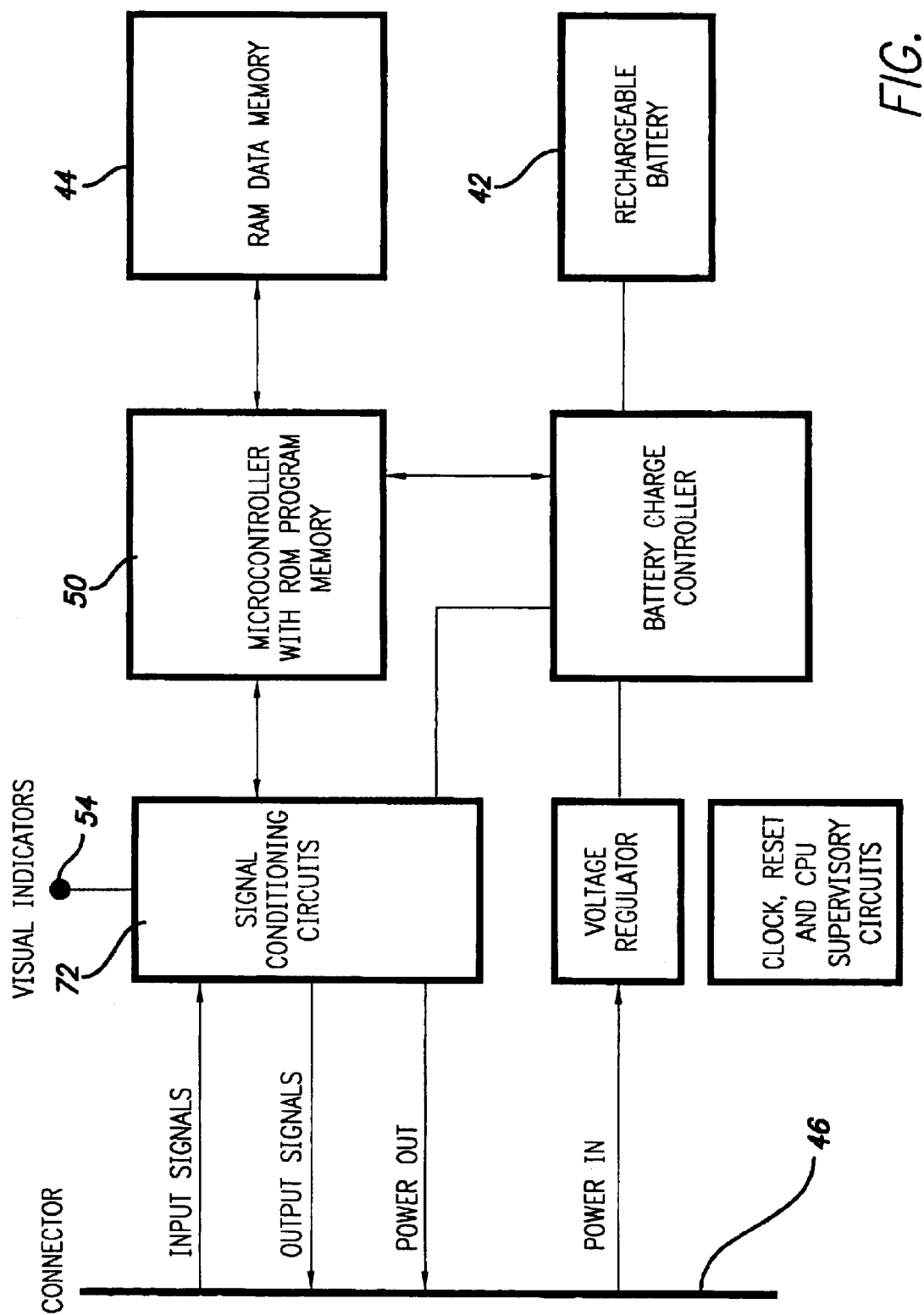
FIG. 6 is a block diagram showing the electronic hardware of the plug-in module.

FIG. 6 shows a block diagram of the game pack 40. The game pack 40 includes a small microcontroller 50 with ROM program memory. This device can be one of many typical 4 or 8 bit controllers such as the 87C51 type manufactured by Intel Corporation. The microcontroller 50 contains software algorithms which monitor and control the operation of the game pack 40, and possibly the operation of the playing unit 60 itself. The game pack 40 includes a connector 46 which consists of several electrical signals. These signals are used to control the operation of the game pack 40 in a game playing system.

Most of the signals on the game pack connector 46 are low voltage, generally in the range of b 3to 5 volts. These signals are conditioned with conventional circuitry 72 to provide protection from static discharge and other interface or noise problems. The game pack 40 receives power from a charging system to recharge the battery 42. Power from the battery 42 is regulated and can be output from the game pack 40 to power the game playing unit 60. The output power is switched so that live battery voltage only exists on the game pack connector 46 when the game pack 40 is inserted in a game playing unit 60.

A small microcontroller 50 is preferably contained in the game pack 40 which provides control of the various game pack functions 60. The microcontroller 50 contains software which handles the transfer of information to and from the nonvolatile memory 44 contained in the game pack 40. The rechargeable battery 42 powers the handset 60 (as well as the game pack 40) and circuitry 52 is provided to charge the battery and monitor the condition of the battery. This condition monitoring includes indicating battery state of charge, low battery warning, and predictive battery life (based on number of charge/discharge cycles and the life of the battery cells).

The microcontroller 50 processes data to and from the game playing unit 60 or host computer 10 and is capable of storing data in the game pack's internal RAM memory 44. This memory 44 is powered by the rechargeable battery 42 which is internal to the game pack 40. The RAM memory 42 can store data representing many various types of information. For example, the memory 42 can store data records describing the game to be played, and the graphic images to be used. For a Bingo game, this memory 42 could contain the number of Bingo games to be played in this session, the type and number of cards for each game and the graphic images to be used to display the game in the game playing unit.

Communication between the microcontroller 50 and the host computer 10 or game playing unit 60 may be accomplished using standard RS-232 serial commands. These commands include data records which can be read from or written to the RAM memory 44.

The game pack 40 includes a rechargeable battery 42 which powers the game pack 40 itself as well as the game playing unit 60. The battery 42 could be any suitable type, such as nickel-cadmium, nickel metal hydride, lead acid or lithium ion. The type of battery technology used depends on the running conditions and recharging requirements for the system. The battery charging cycle is controlled and monitored by a charge controller device 53. This device 53 controls the charge power to the battery 42 and is also capable of monitoring the state of battery charge. The state of charge information is important in order to determine that the game pack 40 has sufficient charge to power the game playing unit 60 in the anticipated use.

The game pack 40 includes several visual LED type indicators 54. These indicate that state of the game pack, for example, a yellow LED indicates the pack is charging. The game pack 40 also includes other general circuits 56 to provide reset control, CPU clock and other supervisory functions.

Note that this embodiment of the invention includes a microcontroller 50 for monitoring and control of various functions of the game pack 40. However, the invention can be implemented in other ways, including a single memory device 44a which includes a serial interface directly to the game pack connector 46. Such memory devices 44a are known as serial EEPROMs and provide serial data transfer and nonvolatile memory storage in a single integrated circuit. Special integrated circuits are also available to control battery charge and condition without the need for a special microcontroller.

Figure 4:
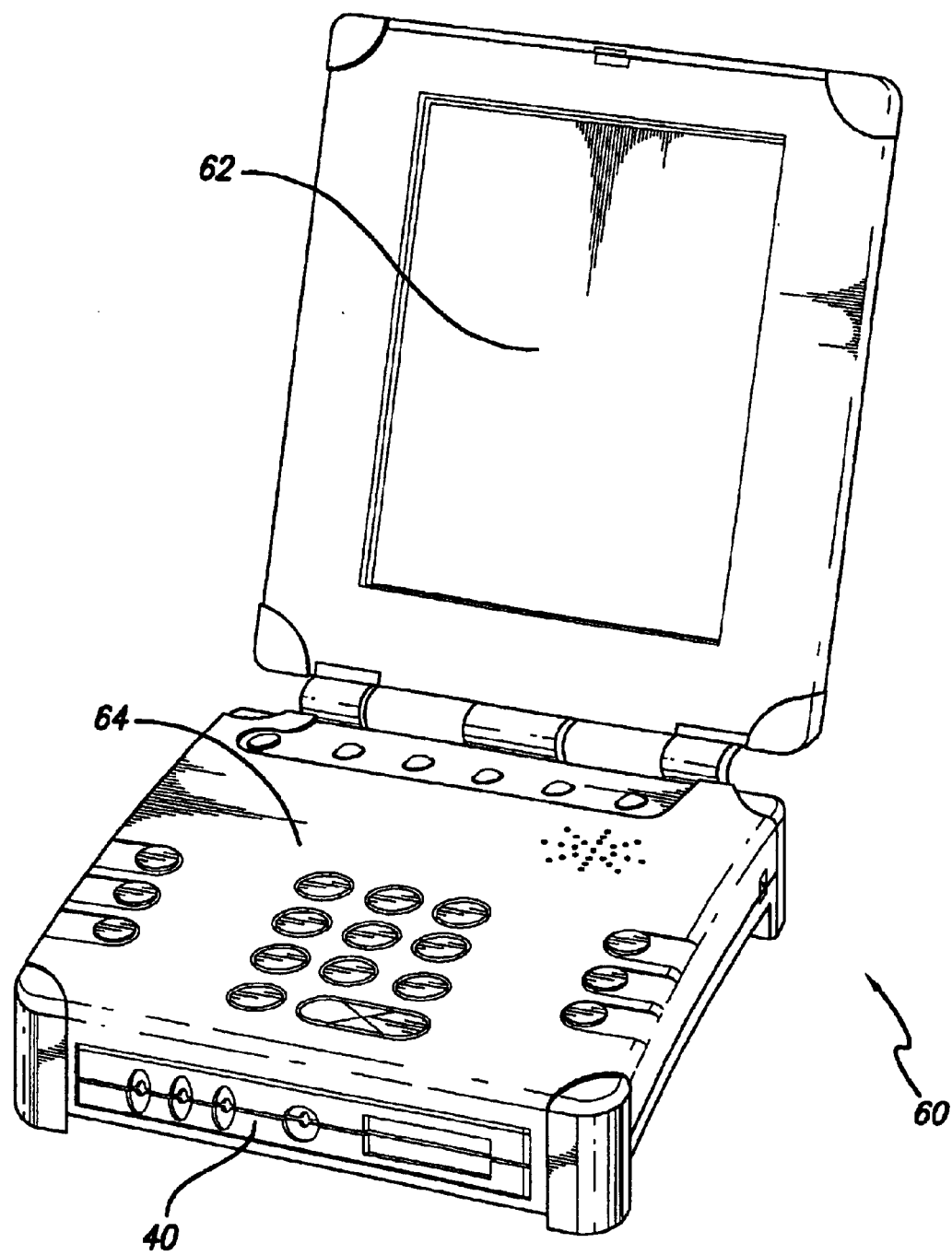
FIG. 4 is a perspective view of the game pack partially inserted into the portable handset or playing unit, the playing unit in an open position.

Each of the playing units 60, as shown in FIG. 4, is configured to receive a plug-in module or game pack 40, the game packs 40 providing power and data to the playing units 60. Each playing unit 60, which may be a portable handset, includes a microprocessor 50a to run a computer program and perform data manipulations. Each handset 60 has input/output devices including a display 62 and keypad or other input user interface 64. Preferably, the display screen 62 of the handset 60 is foldable over the keypad 64 when the handset 60 is not in use.

The game playing unit 60 allows the game pack 40 to be inserted prior to play. The display device 62 is preferably a color LCD graphic display of the game in play, which may require a separate DRAM type memory 68 may be required to buffer the video images for the display. An input device 64 is preferably a keypad with several buttons which can control the game, but could also be a touch-sensitive screen or a radio-frequency receiver. In the preferred embodiment, the system is intended to play the conventional game of Bingo as well as other types of card or gambling games.

Figure 7:
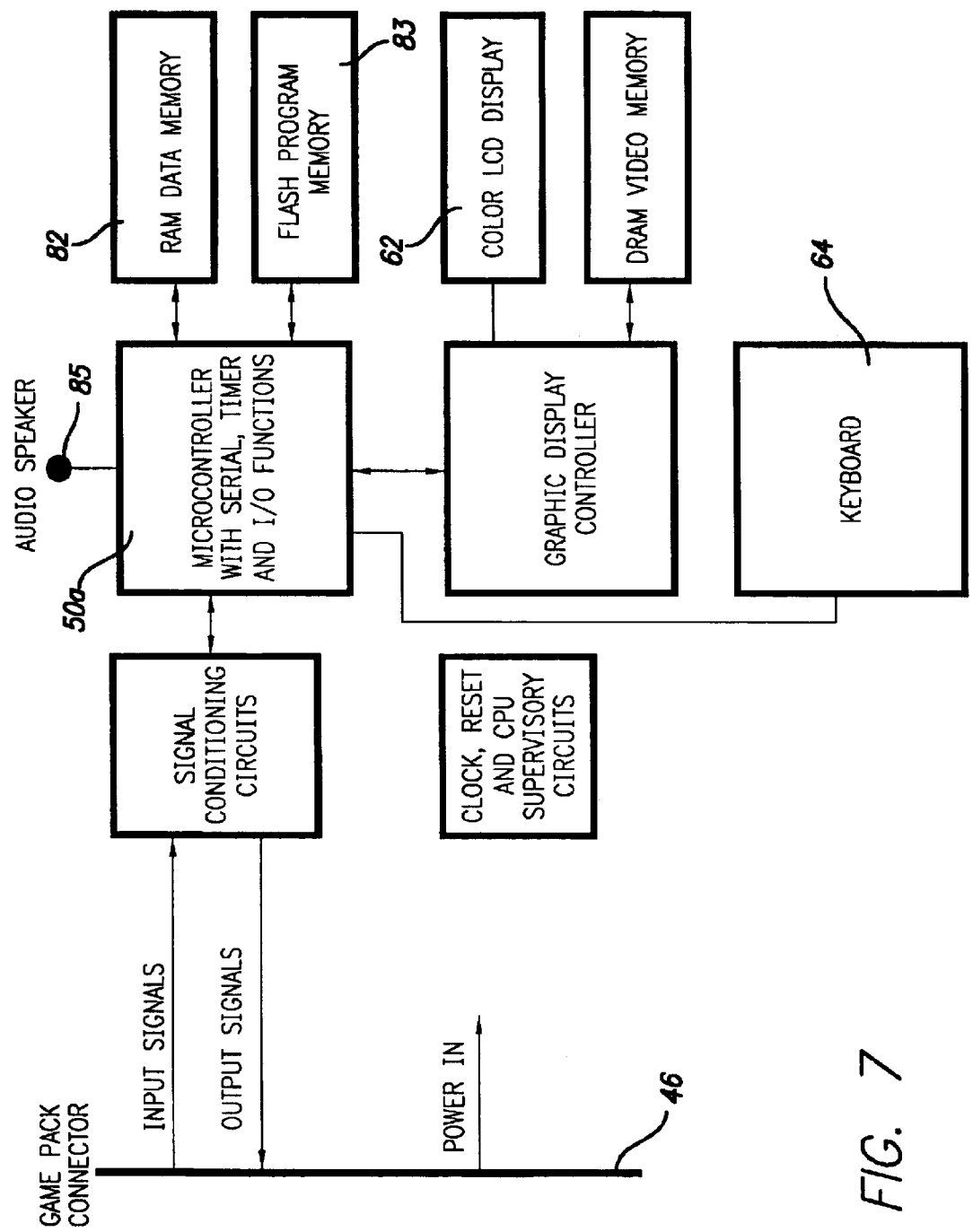
FIG. 7 is a block diagram showing the electronic hardware of the playing unit.

FIG. 7 shows the block diagram of a playing unit 60 connected to a plug-in module or game pack 40. The playing unit 60 has a docking slot 66 designed to receive at least one game pack 40. The slot 66 includes a connector 67 which mates with the connector 46 on the game pack 40. Electrical signals on the connectors allow for serial data communication between either the game pack memory 40 and the playing unit microprocessor 50a, or the game pack microprocessor 50 and the display and input devices of the playing unit 60, depending on where the controlling microprocessor is located. These input and output signals have conventional conditioning circuits to reduce static discharge and also reduce electrical interference noise problems. The microprocessor 50a is optionally connected to a RAM data memory 82 and flash type program memory devices 83. As indicated previously, it is also contemplated that the microprocessor may reside on the game pack or plug-in module 40 from which it controls the playing unit 60, thereby obviating the need for a microprocessor in the playing unit 60.

The user controls the game in play using various pushbuttons and other controls located on the keypad or touch-sensitive input device 64, or the game in play is controlled by radio-frequency signals from the host computer 10. An audio speaker 85 is also provided to create sound effects used to enhance the game play. Conventional microcontroller clock, reset and supervisory circuits 87 are also included.

Applicant's electronic game system provides charging of the game packs 40 and transfer of data, at the charging and interface rack 20 remote from the portable handsets 60 themselves. The portable handsets 60 can be powered and enabled without the need to assemble them at a single location, through use of the game packs 40 and other components of applicant's electronic game pack system.

Figure 2:
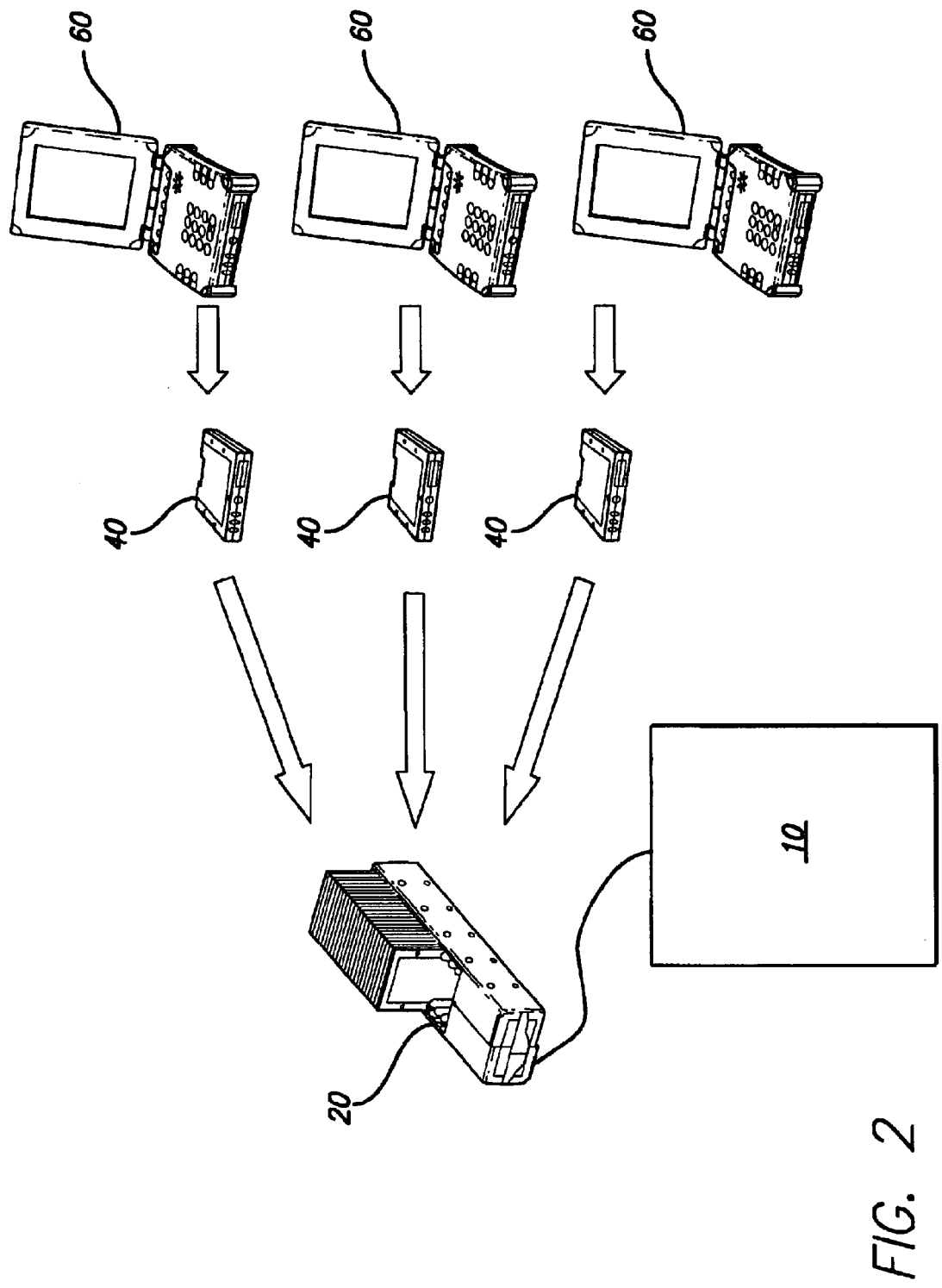
FIG. 2 is a flowchart showing operation of Applicant's playing system for plug-in module recharging and/or redemption of game winnings.

Finally, having summarized the major components of Applicant's invention, referring to the flow charts of FIGS. 1 and 2 it is now possible to disclose the operation, function and use of Applicant's invention as a system for playing the game of bingo or an action adventure game.

First, as shown and described in FIG. 1, initially all the game packs 40 are placed into the charging rack 20 and the batteries 42 are fully charged. As players pay a cashier for a number of bingo cards for a number of bingo games or for a particular adventure game scenario, the cashier operates the central computer 10 to download the bingo card configurations or the fantasy scenario into a game pack 40. Other data, for example, pertaining to different types of game which may be played simultaneously or at another time that day, may also be downloaded into the memory 42 of the game packs 40.

The game pack 40 is removed from the rack 20 and given to the player, who locates and opens the playing unit 60 and inserts the game pack or plug-in module 40 therein. The playing unit 60 receives its power from the game pack 40 and receives game configuration data from the game pack 40.

As the game begins and the bingo numbers are called out, the players each enter those numbers via the handset keypad 64, touch-sensitive screen device, or the like, or the numbers could be entered automatically via a radio-frequency signal issued at least indirectly from the central computer. The handset display 62 shows a single bingo card and includes the capability to switch between card configurations just as one would leaf through the pages of a book, so that player can monitor his or her progress on each of the bingo cards.

Throughout the game, the playing unit 60 may alert the player of his or her bingo cards that are nearing a winning combination. Upon obtaining a bingo, the portable playing unit 60 alerts the player of the same and displays the card or cards having the winning bingo combination. The central computer 10 may be used to verify the winning combination or, since it knows which card configurations that were dispensed to each game pack, to corroborate the bingo. Additionally, the bingo numbers entered by the player may be automatically downloaded onto the game pack 40, and the game pack 40 may be removed from the handset playing unit 60 and brought into communication with the central computer, such that the player may be informed of errors in entering the bingo numbers and those errors may be corrected.

As shown and described in FIG. 2, upon completing play the game pack 40 is removed from the portable handset unit 60 and brought to the redemption cashier station. There it is inserted into the charging rack 20 or the central computer 10 directly, whereby data is transferred to the central computer 10 which generates a display and/or printout of any prize winnings.

Also as shown and described in FIG. 2, all the game packs 40 are collected at the end of play and inserted into the charging rack 20. Visible indicators 59 on the exterior of the game packs 40 show the level of charge for the pack 40.

The present invention also readily applies to other types of games such as action adventure or fantasy games played on such handheld playing units 60. Such game systems may be designed for multi-user play such as at video arcade enterprises or other entertainment or gaming establishments. Such game units 60 often involve high-definition color displays 62 which produce heavy power draw. The units 60 are also vulnerable to being damaged inadvertently or vandalized by the player or, if left in a common area, by other elements. Consequently, it is preferable to have as much capital-intensive subsystems as is possible and practical in the plug-in module 40 that is returned when not in play and that may be efficiently stored in a charging rack 20 or the like.

As described above, the invention—whether for a bingo game, for an action adventure game, or other entertainment systems—provides for a system of efficient recharging of a plurality of batteries 42 required by a plurality of playing units 60, thereby affording the game system to employ ever more entertaining and user-friendly input and output devices in the playing units 60.

While the present invention has been described with regards to particular embodiments, it is recognized that additional variations of the present invention may be devised without departing from the inventive concept.

What is claimed is:

1. An electronic bingo game playing system comprising:
   (a) a master computer comprising a database of game data of possible bingo game card configurations and a communications pan,
   (b) a plurality of playing units each comprising a power-supply port, a communication port, an input device, and a display device,
   (c) a plurality of plug-in modules each comprising a charge port, a communication port, a rechargeable battery device, and a memory device, and
   (d) a charging rack comprising a plurality of slots, each adapted to receive and store one of said plurality of plug-in modules at the same time, to charge the battery device in said plug-in module, and to transfer game data from the master computer to the memory device in said plug-in module, and a handle, said charging rack being detachable from said master computer to facilitate transportation and storage of said plurality of plug-in modules,
   wherein the battery device in each of said plurality of plug-in modules supplies power to one of said plurality of playing units and wherein the memory device in each of said plurality of plug-in modules supplies game data to one of said plurality of playing units.

2. A system as set forth in claim 1 wherein each of said plurality of plug-in modules further comprises chaining circuitry for communicating whether said plug-in module is able to receive game data.

3. A system as set forth in claim 2 wherein each of said plurality of plug-in modules further comprises monitoring circuitry for monitoring the charge status and recharge history of the battery device.

4. A system as set forth in claim 2 wherein each of said plurality of plug-in modules further comprises control circuitry for reading the data stored in the memory device and for operating one of said plurality of playing units.

5. A system as set forth in claim 2 wherein each of said playing units further comprises a microprocessor and control circuitry for reading the data stored in the memory device of one of said plurality of plug-in modules, for interpreting signals from the input device, and for displaying images on the display device.

6. A system as set forth in claim 2 wherein said display device is a color liquid crystal display.

7. A system as set forth in claim 6 wherein each of said plurality of playing units utilizes a dynamic random-access memory device to buffer video images for said display device.

8. A system as set forth in claim 6 wherein each of said plurality of playing units is capable of folding down to protect the surface of said display device when not in use and to facilitate transportation of said playing unit.

9. A method for administering an electronic bingo game playing system comprising the steps of
   (a) inserting a plurality of game packs in a charging rack,
   (b) charging a battery on each of said plurality of game packs,
   (c) storing game data on a memory unit on each of said plurality of game packs,
   (d) removing one or more of said plurality of game packs,
   (e) utilizing the battery on each of said removed game packs to power a game playing device,
   (f) utilizing the genie data of the memory unit on each of said removed game packs to provide images for a display device contained in said game playing device, wherein said game data comprise at least one bingo card configuration,
   (g) re-inserting said plurality of game packs in said charging rack, and
   (h) detachably connecting said charging rack to a central computer and power supply.

10. A method for administering an electronic bingo game playing system as set fort in claim 9, further comprising the steps of
    (a) transporting said plurality of game packs, and
    (b) storing said plurality of game packs in said charging rack between game sessions.

11. A method for administering an electronic bingo game playing system as set forth in claim 9, further comprising the step of detaching said charging rack from said central computer.

12. A method for administering an electronic bingo game playing system as set forth in claim 9, further comprising the step of detaching said charging rack from said power supply.

13. A method for administering an electronic bingo game playing system as set forth in claim 9, further comprising the step of retrieving game data from said memory unit on each of said plurality of game packs.

14. A method for administering an electronic bingo game playing system comprising the steps of
    (a) inserting a plurality of game packs into a charging rack,
    (b) transporting said plurality of game packs in said charging rack,
    (c) storing said plurality of game packs in said charging rack,
    (d) connecting said charging rack to a power supply,
    (e) recharging battery devices in said plurality of game packs,
    (f) detachably connecting said charging rack to a master computer having a database of game data of possible bingo game card configurations,
    (g) transferring game data from said master computer to memory devices in said plurality of game packs using chaining circuitry for communicating whether each of said plurality of game packs is able to receive game data,
    (h) removing one or more of said game packs from said charging rack,
    (i) inserting each of said removed game packs into one of a plurality of handset units,
    (j) thereby supplying power to one of said plurality of playing units through the battery device in said game pack, and
    (k) thereby supplying game data to one of said plurality of playing units through the memory device in said game pack.

15. A method as set forth in claim 14 further comprising the step of monitoring circuitry for monitoring the charge stains and recharge history of the battery device.

16. A method as set forth in claim 14 further comprising the steps of reading the data stored in the memory device of one of said plurality of game packs, interpreting signals from a input device on one of said plurality of handset units, and displaying images on a display device on one of said plurality of handset units.

17. A method as set forth in claim 14 further comprising the step of utilizing a color liquid crystal display to display video images derived from said game data.

18. A method as set forth in claim 17 further comprising the step of utilizing a dynamic random-access memory device to buffer video images for said color liquid crystal display.

19. A method as set forth in claim 14 further comprising the step of folding down said handset unit to protect it when not in use and to facilitate transportation of said handset unit.

* * * * *

UNITED STATES PATENT AND TRADEMARK OFFICE
CERTIFICATE OF CORRECTION

PATENT NO. : 6,769,991 B2
DATED : August 3, 2004
INVENTOR(S) : Kyle Fields

It is certified that error appears in the above-identified patent and that said Letters Patent is hereby corrected as shown below:

Title page,
Item [75], Inventors, change the inventor residence from "Design Labs, Inc., 3054 Fite Cir., #101, Sacramento, CA (US) 95827" to read -- El Dorado Hills, CA (US) 95762 --

Column 10,
Line 26, change "communications pan," to read -- communications port, --

Column 11,
Line 20, change "the genie data" to read -- the game data --

Column 12,
Line 31, change "stains" to read -- state --.

Signed and Sealed this

Nineteenth Day of October, 2004

JON W. DUDAS
*Director of the United States Patent and Trademark Office*